US012625922B2

(12) United States Patent
Gullapudi

(10) Patent No.: US 12,625,922 B2
(45) Date of Patent: May 12, 2026

(54) GREEDY INFERENCE FOR RESOURCE-EFFICIENT MATCHING OF ENTITIES

(71) Applicant: SAP SE, Walldorf (DE)

(72) Inventor: Sundeep Gullapudi, Singapore (SG)

(73) Assignee: SAP SE, Walldorf (DE)

( * ) Notice: Subject to any disclaimer, the term of this patent is extended or adjusted under 35 U.S.C. 154(b) by 1077 days.

(21) Appl. No.: 17/455,046

(22) Filed: Nov. 16, 2021

(65) Prior Publication Data

US 2023/0153382 A1     May 18, 2023

(51) Int. Cl.
*G06F 18/214* (2023.01)
*G06F 18/21* (2023.01)
*G06N 7/01* (2023.01)

(52) U.S. Cl.
CPC .......... *G06F 18/214* (2023.01); *G06F 18/217* (2023.01); *G06N 7/01* (2023.01)

(58) Field of Classification Search
CPC ..................... G06F 18/214–2155; G06N 7/01
See application file for complete search history.

(56) References Cited

U.S. PATENT DOCUMENTS

| 10,558,921 | B2* | 2/2020 | Jayaraman | ............ | G06F 16/285 |
| 2019/0156247 | A1* | 5/2019 | Faulhaber, Jr. | ........ | G06N 3/045 |

| 2020/0050638 | A1* | 2/2020 | Hancock | ........... | G06F 16/90344 |
| 2021/0019309 | A1* | 1/2021 | Yadav | ................. | G06F 16/2428 |
| 2022/0108073 | A1* | 4/2022 | Menon | .................. | G06F 40/295 |

OTHER PUBLICATIONS

"Transformer-Based Neural Network for Answer Selection in Question Answering"(Shao, Taihua ; Guo, Yupu ; Chen, Honghui ; Hao , Zepeng IEEE Access, 2019, vol. 7, p. 26146-26156, Article 26146) (Year: 2019).*

* cited by examiner

*Primary Examiner* — Michael H Hoang
(74) *Attorney, Agent, or Firm* — Fish & Richardson P.C.

(57) ABSTRACT

Methods, systems, and computer-readable storage media for determining a set of potential probability thresholds based on a set of inference results provided by processing testing data through the ML model, for each potential probability threshold in the set of potential probability thresholds, determining an accuracy, selecting a probability threshold from the set of potential probability thresholds, processing an inference job including sets of entity pairs through the ML model to assign a label to each entity pair in the sets of entity pairs, each label being associated with a probability and including a type of multiple types, and for each entity pair having a label of one or more specified types, selectively removing an entity of the entity pair from further processing of the inference job by the ML model based on whether the probability associated with the label meets or exceeds the probability threshold.

17 Claims, 6 Drawing Sheets

300

| Bank Statement ID | Company Code | Amount | Currency | Partner Name | Note |
|---|---|---|---|---|---|
| 1000 | CC1 | 990 | EUR | ACME | 1000789 |
| 2000 | CC2 | 2000 | USD | | 90011 876, 895 REF Soylent |
| ... | ... | ... | ... | ... | ... |

302

| Document # | Company Code | Amount | Currency | Organization |
|---|---|---|---|---|
| 10000789 | CC1 | 1000 | EUR | ACME |
| 90011876 | CC2 | 1200 | USD | Soylent |
| 90011898 | CC2 | 800 | USD | Soylent |
| 10000790 | CC1 | 1100 | EUR | ACME |
| ... | ... | ... | ... | ... |

?

GREEDY INFERENCE FOR RESOURCE-EFFICIENT MATCHING OF ENTITIES

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

In a traditional approach, during inference, each entity (record) from a query set is compared all of the entities in a target set to get the probabilities of matches between the respective entity pairs. That is, each record (entity) of the query set is compared to all records (entities) of the target set. By this inference process, the traditional approach duplicates comparison of entities, which increases the time required to conduct inference as well as computing resources (e.g., processors, memory). Accordingly, the traditional approach is not optimized and results in significant computational costs (e.g., expending processors, memory). This problem is exacerbated when the entity matching task involves large numbers of entities (e.g., millions of target entities and over a hundred thousand query entities). Further, scaling of query entities to target entities is limited because, as the number of entities increases, the computational costs exponentially increase.

SUMMARY

Implementations of the present disclosure are directed to decreasing resource consumption in matching of entities using one or more ML models. More particularly, implementations of the present disclosure are directed to using greedy inference for resource-efficient matching of entities by one or more ML models.

In some implementations, actions include determining a set of potential probability thresholds based on a set of inference results provided by processing testing data through the ML model, for each potential probability threshold in the set of potential probability thresholds, determining an accuracy, selecting a probability threshold from the set of potential probability thresholds, processing an inference job including sets of entity pairs through the ML model to assign a label to each entity pair in the sets of entity pairs, each label being associated with a probability and including a type of multiple types, and for each entity pair having a label of one or more specified types, selectively removing an entity of the entity pair from further processing of the inference job by the ML model based on whether the probability associated with the label meets or exceeds the probability threshold. Other implementations of this aspect include corresponding systems, apparatus, and computer programs, configured to perform the actions of the methods, encoded on computer storage devices.

These and other implementations can each optionally include one or more of the following features: the probability threshold is selected as a lowest potential probability threshold in the set of potential probability thresholds having an accuracy that meets or exceeds a target accuracy; selectively removing an entity of the entity pair from further processing of the inference job by the ML model includes adding a key of the entity to a set of matched keys in response to determining that the probability associated with the label, wherein the set of matched keys is used to selectively filter entities from being processed in the inference job; the one or more specified types include one or more of a single match and a multi-match; the set of potential probability thresholds includes unique probabilities included in the inference results; actions further include determining a set of keys for a set of entities, each key in the set of keys uniquely identifying an entity, comparing keys in the set of keys to matched keys in a set of matched keys, and removing an entity from the set of entities in response to determining that a key identifying the entity is included in the set of matched keys; and each entity pair includes a query entity and a target entity, the target entity being selectively removed based on whether the probability associated with the label meets or exceeds the probability threshold.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
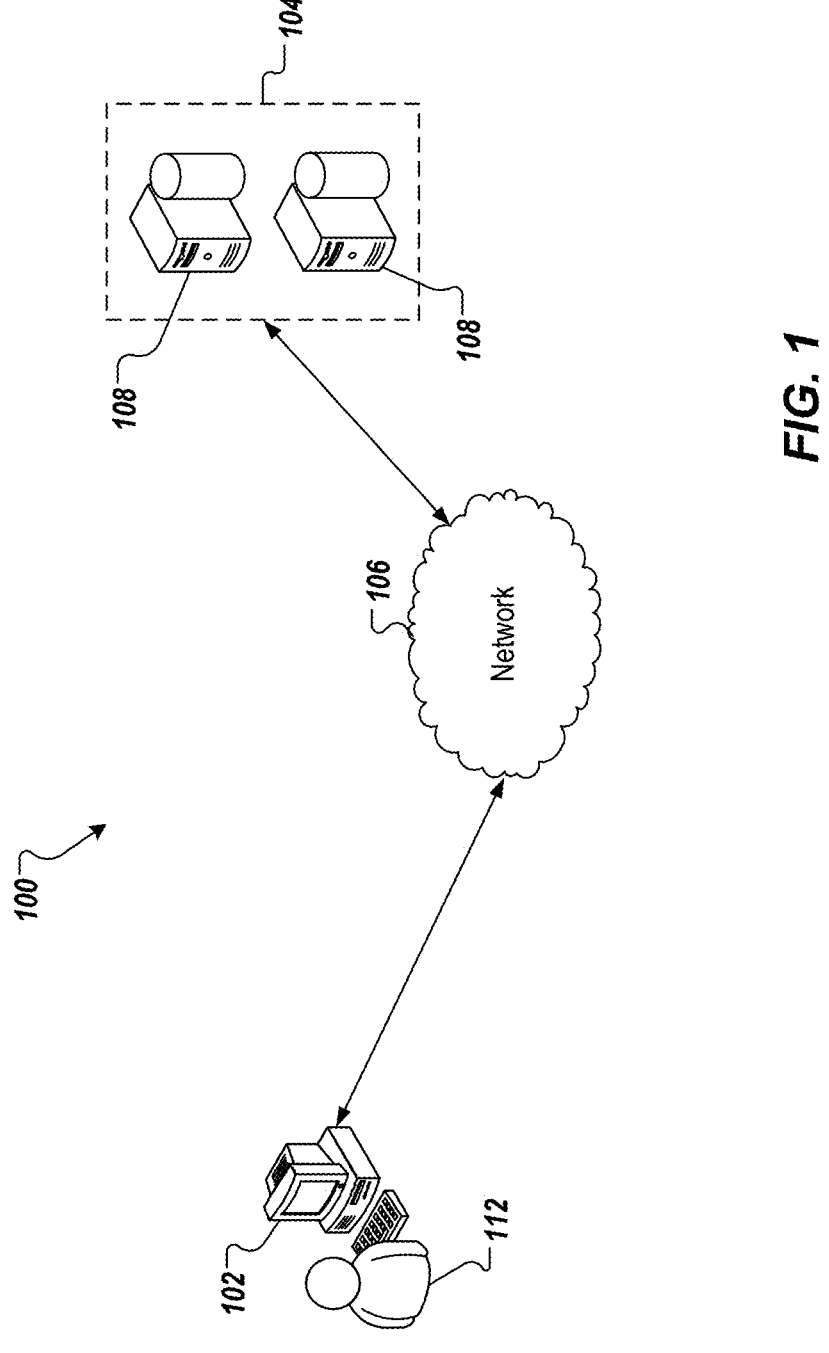
FIG. 1 depicts an example architecture that can be used to execute implementations of the present disclosure.

Implementations of the present disclosure are directed to decreasing resource consumption in matching of entities using one or more ML models. More particularly, implementations of the present disclosure are directed to using greedy inference for resource-efficient matching of entities by one or more ML models.

Implementations can include actions of determining a set of potential probability thresholds based on a set of inference results provided by processing testing data through the ML model, for each potential probability threshold in the set of potential probability thresholds, determining an accuracy, selecting a probability threshold from the set of potential probability thresholds, processing an inference job including sets of entity pairs through the ML model to assign a label to each entity pair in the sets of entity pairs, each label being associated with a probability and including a type of multiple types, and for each entity pair having a label of one or more specified types, selectively removing an entity of the entity pair from further processing of the inference job by the ML model based on whether the probability associated with the label meets or exceeds the probability threshold.

Implementations of the present disclosure are described in further detail with reference to an example problem space that includes the domain of finance and matching bank statements to invoices. More particularly, implementations of the present disclosure are described with reference to the problem of, given a bank statement (e.g., a computer-readable electronic document recording data representative of a bank statement), enabling an autonomous system to determine one or more invoices (e.g., computer-readable electronic documents recording data representative of one or more invoices) that are represented in the bank statement using a ML model. It is contemplated, however, that implementations of the present disclosure can be realized in any appropriate problem space.

Implementations of the present disclosure are also described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP Leonardo Machine Learning) to learn accounting activities and to capture rich detail of customer and country-specific behavior. An example accounting activity can include matching payments indicated in a bank statement to invoices for clearing of the invoices. For example, using an enterprise platform (e.g., SAP S/4 HANA), incoming payment information (e.g., recorded in computer-readable bank statements) and open invoice information are passed to a matching engine, and, during inference, one or more ML models predict matches between records of a bank statement and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an autonomous system that uses a ML model to match entities. That is, the server system 104 can receive computer-readable electronic documents (e.g., bank statement, invoice table), and can match entities within the electronic document (e.g., a bank statement) to one or more entities in another electronic document (e.g., invoice table). In some examples, the server system 104 includes a ML platform that provides and trains a ML model, as described herein.

Figure 2:
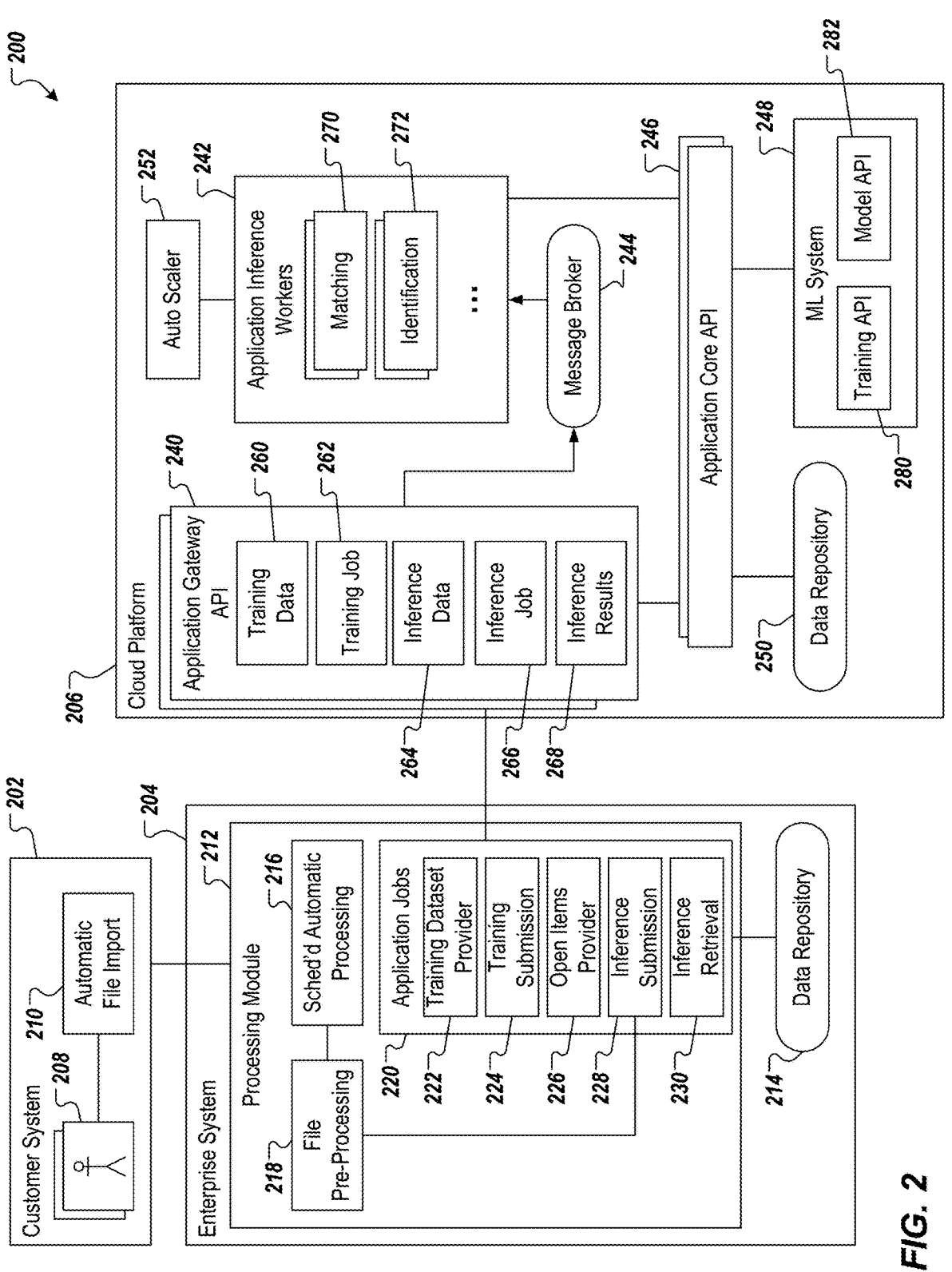
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise platform 204 (e.g., SAP S/4 HANA) and a cloud platform 206 (e.g., SAP Cloud Platform (Cloud Foundry)). As described in further detail herein, the enterprise platform 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise platform 204 for processing by a ML application. For example, and in the context of CashApp, an invoice data file and a bank statement data file can be imported to the enterprise platform 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise platform 204 includes a processing module 212 and a data repository 214. In the context of CashApp, the processing module 212 can include a finance—accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264

(e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 262. In response, the application gateway API 240 sends a training request to the ML system 248 through the application core API 246. By way of non-limiting example, the ML system 248 can be provided as SAP Leonardo Machine Learning. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

To provide further context for implementations of the present disclosure, and as introduced above, the problem of matching entities represented by computer-readable records (electronic documents) appears in many contexts. Example contexts can include matching product catalogs, deduplicating a materials database, and matching incoming payments from a bank statement table to open invoices, the example context introduced above.

Figure 3:
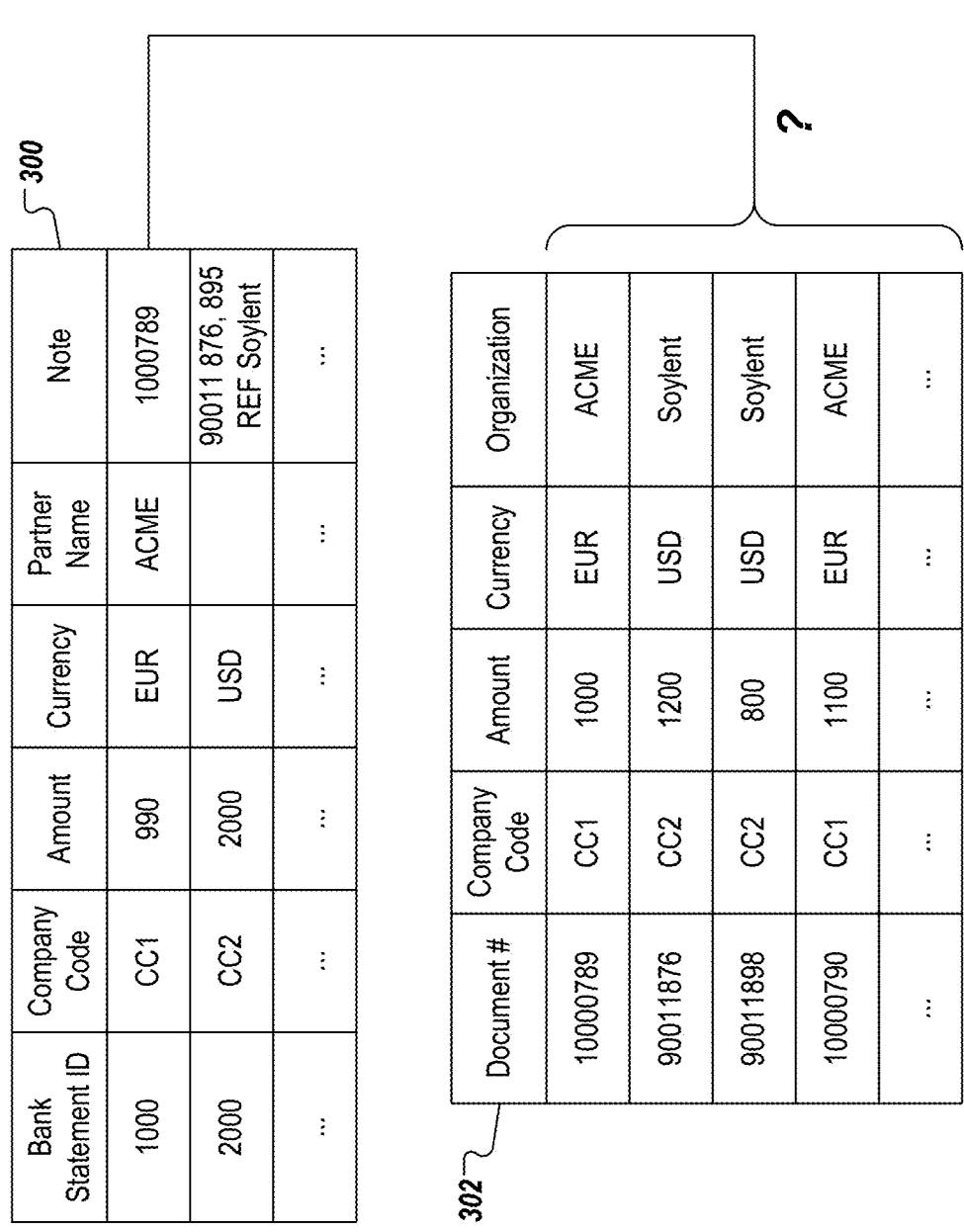
FIG. 3 depicts portions of example electronic documents.

In the example context, FIG. 3 depicts portions of example electronic documents. In the example of FIG. 3, a first electronic document 300 includes a bank statement table that includes records representing payments received, and a second electronic document 302 includes a table that includes records representing invoices that had been issued. In the example context, each bank statement record is to be matched to one or more invoice records. Accordingly, the first electronic document 300 and the second electronic document 302 are processed using one or more ML models that provide predictions regarding matches between a bank statement record (entity) and one or more invoice records (entity/-ies) (e.g., using CashApp, as described above).

To achieve this, a ML model is provided as a classifier that is trained to predict entity pairs to a fixed set of class labels ($\vec{l}$). For example, the set of class labels ($\vec{l}$) can include 'no match,' 'single match,' and 'multi match.' In some examples, the ML model is provided as a function $f$ that maps a query table ($\vec{a}$) and a target table ($\vec{b}$) into a vector of probabilities ($\vec{p}$) (also called 'confidences' in the deep learning context) for the labels in the set of class labels. This can be represented as:

$$f\left(\vec{a}, \vec{b}\right) = \begin{pmatrix} p_0 \\ p_1 \\ p_2 \end{pmatrix}$$

where $\vec{p} = \{p_0, p_1, p_2\}$. In some examples, $p_0$ is a prediction probability of the entity pair $\vec{a}$, $\vec{b}$ belonging to a first class (e.g., no match), $p_1$ is a prediction probability of the entity pair $\vec{a}$, $\vec{b}$ belonging to a second class (e.g., single match), and $p_2$ is a prediction probability of the entity pair $\vec{a}$, $\vec{b}$ belonging to a third class (e.g., multi match).

Here, $p_0$, $p_1$, and $p_2$ can be provided as numerical values indicating a likelihood that the entity pair $\vec{a}$, $\vec{b}$ belongs to a respective class. In some examples, the ML model can assign a class to the entity pair $\vec{a}$, $\vec{b}$ based on the values of $p_0$, $p_1$, and $p_2$. In some examples, the ML model can assign the class corresponding to the highest value of $p_0$, $p_1$, and $p_2$. For example, for an entity pair d, b, the ML model can provide that $p_0=0.13$, $p_1=0.98$, and $p_2=0.07$. Consequently, the ML model can assign the class 'single match' to the entity pair $\vec{a}$, $\vec{b}$.

In a traditional approach, during inference, each entity (record) from the query table is compared to all of the entities in the target table to get the probabilities of matches between the respective entity pairs. That is, each record (entity) of the query table is compared to all records (entities) of the target table. By this inference process, the traditional approach duplicates comparison of entities, which increases the time required to conduct inference as well as computing resources (e.g., processors, memory). To highlight this problem, the following example tables can be considered:

TABLE 1

| Bank Statement Table |
| --- |
| Bank Statement |
| BS1 |
| BS2 |
| BS3 |

TABLE 2

| Invoices Table |
| --- |
| Invoices |
| IV1 |
| IV2 |
| IV3 |
| IV4 |

TABLE 3

| ML Model Probabilities of Matches between Entity Pairs | | | | |
| --- | --- | --- | --- | --- |
| Bank | | Probability | | |
| Statement | Invoice | No | Single | Multi |
| BS1 | IV1 | 0.2 | 0.1 | 0.7 |
| BS1 | IV2 | 0.3 | 0.1 | 0.6 |
| BS1 | IV3 | 0.6 | 0.2 | 0.2 |
| BS1 | IV4 | 0.7 | 0.2 | 0.1 |
| BS2 | IV1 | 0.6 | 0.2 | 0.1 |
| BS2 | IV2 | 0.5 | 0.3 | 0.2 |

In the example of Table 3, it can be seen that, based on the probabilities provided from the ML mode, BS1 (Bank Statement Item 1) is a multi-match that is matched against the IV1 (Invoice item 1) and IV2 (Invoice Item 2). Even so, when evaluating BS2 (Bank Statement 2), the traditional approach again checks whether there are any matches for IV1 (Invoice) and IV2 (Invoice).

The example of Table 3 represents an unoptimized way of matching entities, which results in significant computational costs (e.g., expending processors, memory) and time. This problem is exacerbated when the entity matching task involves large numbers of entities (e.g., millions of invoice records and over millions of bank statement records). Implementations of the present disclosure are effective in scenarios where the number of records in both the matching tables are nearly same quantity, and where the number of records in the matching tables is different. Further, scaling of first entities (e.g., bank statement records) to second entities (e.g., invoice records) is limited because, as the number of records increases, the computational costs exponentially increase. For example, processing complexity can be represented as n×m, where n is the number of first entities (e.g., bank statement records) and m is the number of second entities (e.g., invoice records). By way of non-limiting example, and for simplicity of calculation, n==m, such that the processing complexity is represented as $n^2$. The following table illustrates the exponential increase in processing complexity:

TABLE 4

| Example Processing Complexity | |
| --- | --- |
| n | Processing Complexity |
| 1 | 1 |
| 10 | 100 |
| 100 | 10000 |
| 1000 | 1000000 |

In view of the above context, implementations of the present disclosure are directed to decreasing resource consumption in matching of entities using one or more ML models. More particularly, implementations of the present disclosure are directed to using greedy inference for resource-efficient matching of entities by one or more ML models.

For example, and with reference to Table 3, because BS1 is matched with IV1 and IV2, implementations of the present disclosure selectively eliminate inference for combinations of BS2 and IV1 and BS2 and IV2. That is, processing of the pairs [BS2, IV1] and [BS2, IV2] through the ML model for inference is avoided, thereby decreasing the processing complexity of matching entities between sets of entities and correspondingly decreasing the burden on technical resources that would otherwise be expended.

In further detail, a training pipeline for training a ML model includes multiple phases. Example phases include training the ML model, validating the ML model, and testing the ML model. Example phases include a training phase, a validation phase, and a testing phase. In some examples, training data is provided and includes known inputs and known outputs. In some examples, the training data is divided into sub-sets, each sub-set being used for a respective phase of the training pipeline. For example, the training data can be divided into a training sub-set, a validation sub-set, and a testing sub-set.

In the training phase, the ML model is trained on training data in the training sub-set. The ML model is iteratively trained, where, during an iteration, also referred to as epoch, one or more parameters of the ML model are adjusted, and an output is generated based on the training data (e.g., class predictions). For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration (epoch) of training. In some examples, the iterative training continues for a pre-defined number of iterations (epochs).

In the validation phase, the (trained) ML model is evaluated using the validation sub-set. For example, the known inputs can be processed through the ML model to generate respective predictions, and the predictions can be compared to the respective known outputs of the validation sub-set to validate the ML model. In general, the validation phase provides an unbiased evaluation of a fit of the ML model on the training sub-set. In some examples, one or more hyperparameters (e.g., high-level hyperparameters) of the ML model can be adjusted during the validation phase.

In the testing phase, the (trained and validated) ML model is tested based on the test sub-set and an accuracy of the ML model can be determined. For example, the known inputs can be processed through the ML model to generate respective predictions, and the predictions can be compared to the respective known outputs of the test sub-set to test the ML model. An accuracy of the ML model can be provided by comparing the number of correct predictions to the total number of predictions performed during the testing phase.

Implementations of the present disclosure provide for benchmarks that represent how well the ML model performs in processing validation data and testing data. More particularly, and as described in further detail herein, during the validation phase and the testing phase, potential probability threshold to accuracy is determined. In some examples, the probability threshold to accuracy values are determined by selecting unique prediction confidences among the validation data and, for each confidence (threshold), accuracy values are calculated. In some examples, accuracy values are defined as the number of correct values predicted at or above that threshold among all of the values predicted at or above that threshold. Using this calculation, implementations of the present disclosure select optimal confidence values as thresholds, which indicate instances where the ML model predicts sufficiently correct values. Here, sufficiently correct can include an accuracy meeting or exceeding a threshold accuracy.

To illustrate implementations of the present disclosure, the following non-limiting example can be considered:

TABLE 5

| Example Inference Results in Validation and/or Test Phases | | | | |
|---|---|---|---|---|
| Index | BS | IV | Probability | Correct? |
| 1 | BS1 | IV5 | 0.6 | 1 |
| 2 | BS2 | IV3, IV4 | 0.5 | 1 |
| 3 | BS3 | IV1, IV6 | 0.7 | 1 |
| 4 | BS4 | IV2 | 0.3 | 0 |

TABLE 5-continued

| Example Inference Results in Validation and/or Test Phases | | | | |
|---|---|---|---|---|
| Index | BS | IV | Probability | Correct? |
| 5 | BS5 | IV7, IV8 | 0.7 | 0 |
| 6 | BS6 | IV9 | 0.5 | 1 |
| . . . | . . . | . . . | . . . | . . . |

In the example of Table 5, a correct prediction is indicated as 1 and an incorrect prediction is indicated as 0. In this example, the following set of probabilities is provided [0.3, 0.5, 0.5, 0.6, 0.7, 0.7], and the following set of potential probability thresholds is provided [0.3, 0.5, 0.6, 0.7].

In accordance with implementations of the present disclosure, a set of potential probability thresholds can be provided, from which a probability threshold can be determined for use in greedy inference, as described herein. In some examples, the potential probability thresholds is determined based on the set of probabilities. Continuing with the example above, a set of potential probability thresholds is provided as [0.3, 0.5, 0.6, 0.7]. An accuracy value is determined for each potential probability threshold. In some examples, the accuracy value is determined as the number of correct values predicted at or above a respective potential probability threshold among all of the values predicted at or above that potential probability threshold.

For example, and with continued non-limiting reference to the example of Table 5, the following example accuracy values can be determined:

TABLE 6

| Example Accuracies | | |
|---|---|---|
| Potential Probability Threshold | Metrics | Accuracy |
| 0.3 | 750 correct 1000 total | 0.75 |
| 0.5 | 712 correct 750 total | 0.95 |
| 0.6 | 490 correct 500 total | 0.98 |
| 0.7 | 247 correct 250 total | 0.99 |

Using the accuracies, a probability threshold can be selected from the set of probability thresholds. In some examples, the probability threshold is selected as the lowest potential probability threshold having an accuracy that meets or exceeds a target accuracy. For example, and continuing with the example above, a target accuracy can be provided as 0.95. Consequently, 0.5 can be selected as the probability threshold, because 0.5 is the lowest potential probability threshold having an accuracy that meets or exceeds the target accuracy.

In accordance with implementations of the present disclosure, during inference, the probability threshold can be used to selectively remove target entities from further consideration. More particularly, during inference, and for a given query entity (e.g., bank statement record) and a given target entity (e.g., invoice record) a class is selected (e.g., no match, single match, multi-match) with a respective probability, as discussed above. If the class indicates a match (e.g., single, multi-match) and the probability meets or exceeds the probability threshold, the target entity is removed from further consideration. That is, the target entity is considered to have been matched to the query entity, such that there is sufficient confidence that no other query entity also matches the target entity. Here, sufficient confidence is provided in terms of the probability of the match meeting or exceeding the probability threshold. If the class indicates a match (e.g., single, multi-match), but the probability does not meet or exceed the probability threshold, the target entity is not removed and is further considered in subsequent inference(s). That is, the target entity is considered to not have been matched to the query entity with sufficient confidence that no other query entity also matches the target entity. If the class does not indicate a match (e.g., single, multi-match), the target entity is not removed and is further considered in subsequent inference(s).

As described herein, implementations of the present disclosure enable the probability threshold to be tuned to the ML model. That is, the probability threshold is determined based on an accuracy of the ML model with respect to the probability threshold. In this manner, the lowest possible probability threshold is selected that still achieves a target accuracy, which enables more entities to be removed from further consideration in inference than would be removed by selecting a higher probability threshold. For example, and continuing with the example above, if the probability threshold were selected to be 0.7, any matches associated with a probability of less than 0.7 would not be removed from further consideration. By instead selecting 0.5 as the probability threshold, more entities would be removed.

Implementations of the present disclosure also provide a persistence (e.g., cache, global dictionary, database). In some examples, the persistence records the keys (e.g., document number) of entities of a set of entities that have been matched and that are to be removed from further consideration. For example, persistence can be a global dictionary that can record a key of each target entity that is to be removed from further consideration, as described herein (e.g., the class indicates a match with a probability that meets or exceeds the threshold probability). In the example context, the global dictionary can record the key of each invoice record in a set of invoice records that has already been matched to a bank statement record with sufficient confidence. For example, in response to the ML model predicting a match between an invoice record and a bank statement record with a probability that exceeds the probability threshold, the key of the invoice record is added to the global dictionary. In some examples, the key is a value of the invoice record within a designated field (column). With reference to FIG. 3, example keys can include document numbers from the document number (#) field of the second electronic document 302.

Figure 4:
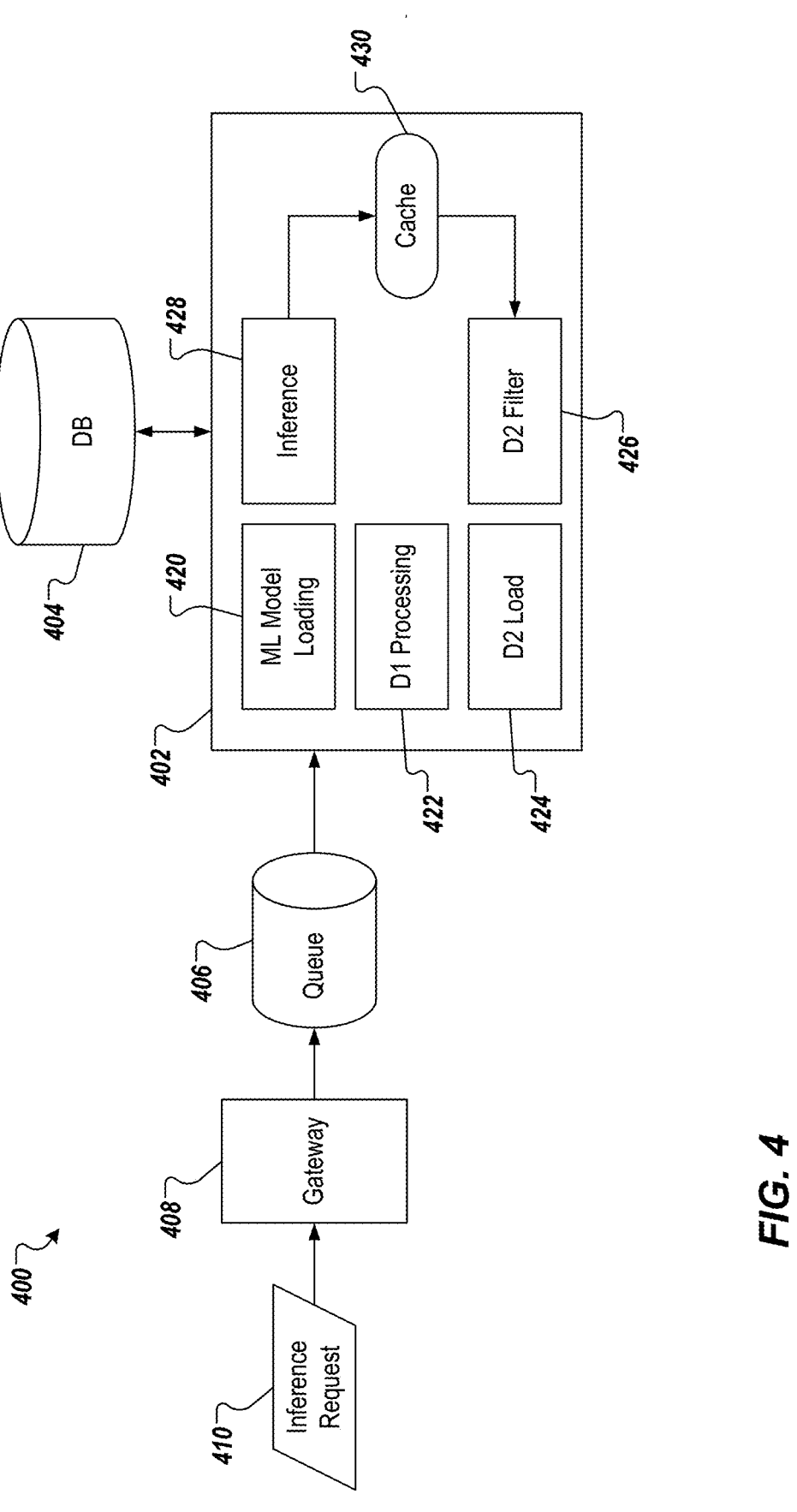
FIG. 4 depicts an example conceptual architecture in accordance with implementations of the present disclosure.

FIG. 4 depicts an example conceptual architecture 400 in accordance with implementations of the present disclosure. In the example of FIG. 4, the example conceptual architecture 400 includes an inference system 402, a database 404, a queue 406, and a gateway 408. As described in further detail herein, the inference system 402 receives an inference request 410 (e.g., an inference job 266 of FIG. 2) through the gateway 408 and the queue 406. The inference system 402 processes the inference request 410 to provide predictions (inference results) that are stored in the database 404. In the context of implementations of the present disclosure, the inference request 410 includes a request to match entities in a first set of entities (e.g., bank statement records) to entities in a second set of entities (e.g., invoice records). In this context, predictions provided by the inference system 402 each include a class of match between entities (e.g., no match, single match, multi match).

In the example of FIG. 4, the inference system 402 includes a ML model loading module 420, a first document (D1) processing module 422, a second document (D2)

loading module 424, a second document (D2) filtering module 426, an inference module 428, and a cache 430. In some examples, in response to the inference request 410, the ML model loading module 420 loads a ML model to be used to process the inference request 410. In some examples, the inference request 410 can provide a parameter that indicates, which ML model is to be loaded. An example parameter can include a model identifier that identifies a ML model that is to be loaded and/or an enterprise identifier that identifies a party (e.g., enterprise) on behalf of which the inference is to be performed. A ML model associated with the parameter can be loaded. For example, a ML model that is specific to a party identified from the inference request 410 is loaded (e.g., the ML model is trained using training data of the party).

In some examples, the first document processing module 422 pre-processes the first document (D1) to be in a proper format for inference. In some examples, the second document (D2) load module 424 loads the second document that stores data representative of entities that are to be matched to entities represented in the first document. In the example context, the entities can include invoice records representing open invoices that have not yet been cleared.

In accordance with implementations of the present disclosure, the second document (D2) filter 426 selectively filters entities represent in the second document from being processed for inference. In some examples, the second document (D2) filter 426 receives a set of matched keys, each matched key being associated with an entity represented in the second document that has already been matched to an entity represented in the first document. In some examples, the set of matched keys is provided from the global dictionary that is stored in the cache 430. For example, and as described herein, the global dictionary stores keys of second documents associated with entities that have already been matched with sufficient confidence (e.g., the match is associated with a probability that exceeds a threshold probability).

In some implementations, the second document (D2) filter 426 compares each key of entities in the second document to the set of matched keys. If a key of an entity in the second document is included in the set of matched keys, the entity is filtered from (removed from, deleted) the second document. In some examples, after filtering zero or more entities from the second document, the first document and the second document are processed by the inference module 428. As a note, it can occur that zero entities are filtered from the second document, if no keys in the second document are provided as matched keys in the set of matched keys (e.g., at the outset of matching before any entities have been matched).

In some implementations, the inference module 428 compares entities of the first document (query entities) to entities of the second document (target entities) to determine whether any pairs of entities are considered a match, as described herein. For example, and with reference to the example context, a query entity can include a bank statement record and a target entity can include an invoice record. In some examples, the inference module 428 only considers target entities that have not been previously matched with sufficient confidence, because any target entities that had been previously matched with sufficient confidence were filtered from the second document by the second document (D2) filter 426. That is, because the second document (D2) filter 426 selectively removes target entities based on keys recorded in the global dictionary stored in the cache 430, those target entities are no longer considered by the inference module 428 in subsequent matching operations.

In accordance with implementations of the present disclosure, for any matches (e.g., single, multi) identified by the inference module 428, a probability of the match is compared to a probability threshold. If the probability meets or exceeds the probability threshold, the match is considered to have sufficient confidence that the target entity can be removed from further consideration. In response, the inference module 428 stores a key associated with the target entity (as a matched key) in the global dictionary stored in the cache 430. In this manner, in subsequent inference runs, the matched key will be filtered by the second document (D2) filter 426, as described herein.

Figure 5:
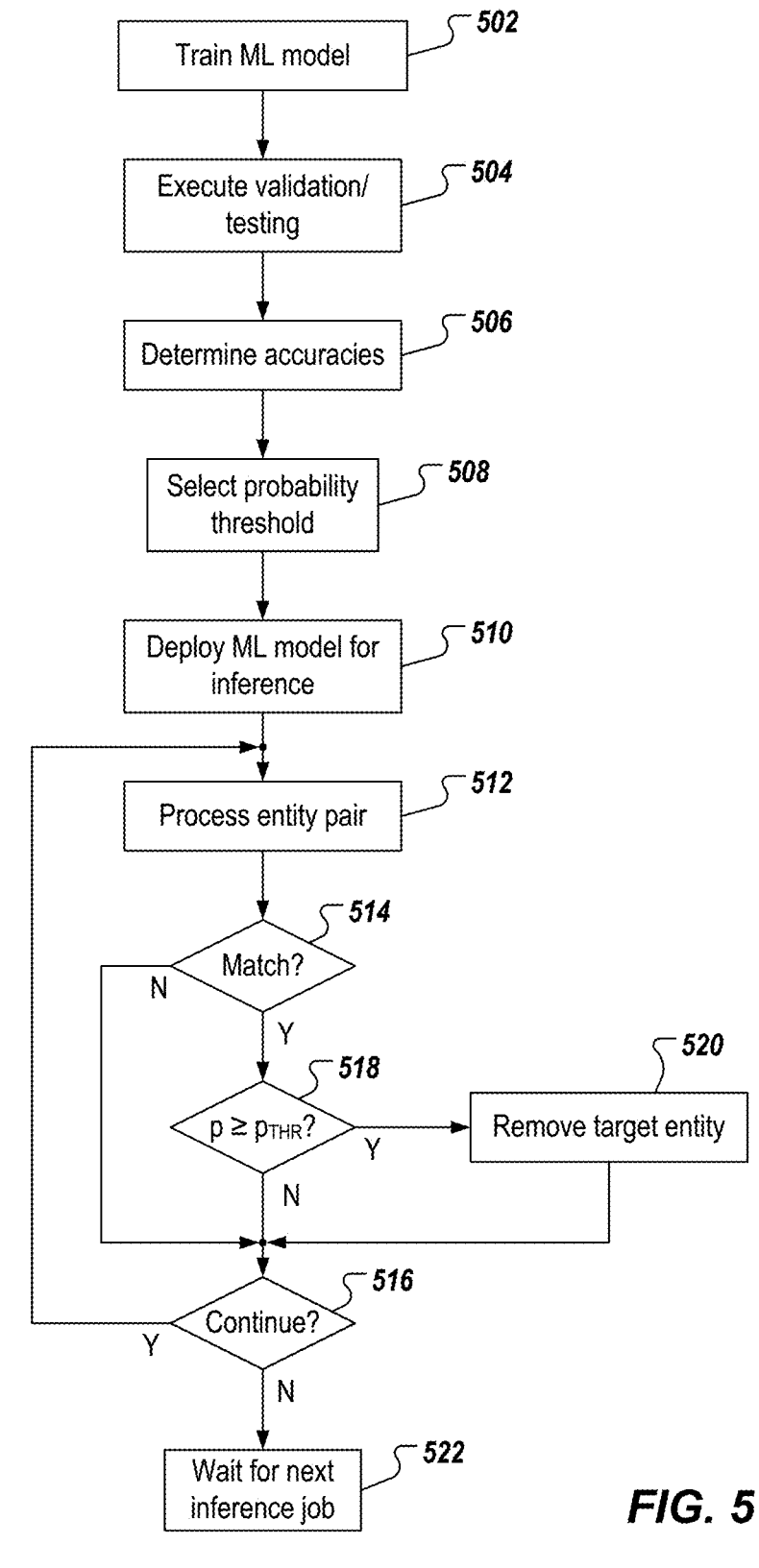
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A ML model is trained (502). For example, and as described herein, the ML model is trained on training data in the training sub-set. the ML model is iteratively trained, where, during an iteration, also referred to as epoch, one or more parameters of the ML model are adjusted, and an output is generated based on the training data (e.g., class predictions). In some examples, the iterative training continues for a pre-defined number of iterations (epochs). Validation and/or testing of the ML model are executed (504). For example, and as described herein, in the validation phase, the (trained) ML model is evaluated using the validation sub-set, and, in the testing phase, the (trained and validated) ML model is tested based on the test sub-set.

For each potential probability threshold in a set of potential probability thresholds, an accuracy is determined (506). For example, and as described herein, inference results (e.g., as depicted in Table 5) on the validation phase and testing phase, and a set of potential probability thresholds is provided. In some examples, the set of potential probability thresholds includes unique probabilities provided in the inference result. For each potential probability threshold, an accuracy is determined. In some examples, the accuracy is determined as the number of correct values predicted at or above a respective potential probability threshold among all of the values predicted at or above the respective potential probability threshold. A probability threshold is selected (508). For example, and as described herein, the probability threshold is selected as the lowest potential probability threshold having an accuracy that meets or exceeds a target accuracy.

The ML model is deployed for inference (510). For example, and as described herein, the ML model is deployed for production use, during which inference jobs are executed to match entities of a first document to entities of a second document. An entity pair is processed (512). For example, and as described herein, entities in the second document are selectively filtered from inference based on whether keys of the entities are includes in a set of matched keys (e.g., stored in the global dictionary). Of the remaining entities, entity pairs are processed to determine a class label for respective entities.

It is determined whether the entity pair is considered a match (514). For example, and as described herein, the entity pair is processed by the ML model to assign a class label to the entity pair. If the class label indicates a match, it is determined that the entity pair is a match. If the class label indicates no match, it is determined that the entity pair is not a match. If the entity pair is not considered a match, it is determined whether inference is to continue (516). For example, and as described herein, other entity pairs can be processed by the ML model to assign class labels.

If the entity pair is a match, it is determined whether a probability (p) of the match meets or exceeds the probability threshold ($p_{THR}$) (518). For example, and as described herein, the class label (e.g., single match, multi-match) assigned to the entity pair is associated with a probability (e.g., a likelihood that the class label is correct for the entity pair). If the probability (p) is less than the probability threshold ($p_{THR}$), it is determined whether inference is to continue (516). If the probability (p) of the match meets or exceeds the probability threshold ($p_{THR}$), the target entity of the entity pair is removed from further inference processing (520), and it is determined whether inference is to continue (516). For example, and as described herein, a key of the target entity is added to the global dictionary. In this manner, the target entity is filtered from consideration in any subsequent inferences of the inference job that is being processed. If it is determined that inference is not to continue, the ML platform waits for a next inference job to be submitted (522).

Implementations of the present disclosure achieve one or more of the following example advantages. Implementations of the present disclosure reduce the time required to complete an inference job and reduce consumption of technical resources (e.g., CPU cycles, memory) by removing matched entities from further consideration in inference. As described herein, matches having a probability that meets or exceeds the probability threshold result in the respective target entity being removed from further consideration.

To illustrate advantages achieved by implementations of the present disclosure, a single match scenario can be considered, the load of which can be reduced up to half (for multi-match, the load can be reduced to a greater degree). In the example of single match, a set of query entities ($e_{Q,1}, e_{Q,2}, \ldots, e_{Q,n}$) is to be matched to a set of entities ($e_{T,1}, e_{T,2}, \ldots, e_{T,m}$). In the below equation, the number of query entities $e_Q$ is represented by m and the number of target entities $e_T$ is represented by n. The computational complexity can be represented using the following relationship:

$$n \times m - \left( \frac{m(m-1)}{2} \right)$$

If n==m, this relationship can be rewritten as:

$$\frac{n^2 + n}{2}$$

If n=1000, the computational complexity is 500,500, which is almost half of the computational complexity of 1,000,000 of the traditional approach described herein (e.g., $n^2$=1,000, 000, when n=1000, per Table 4).

Figure 6:
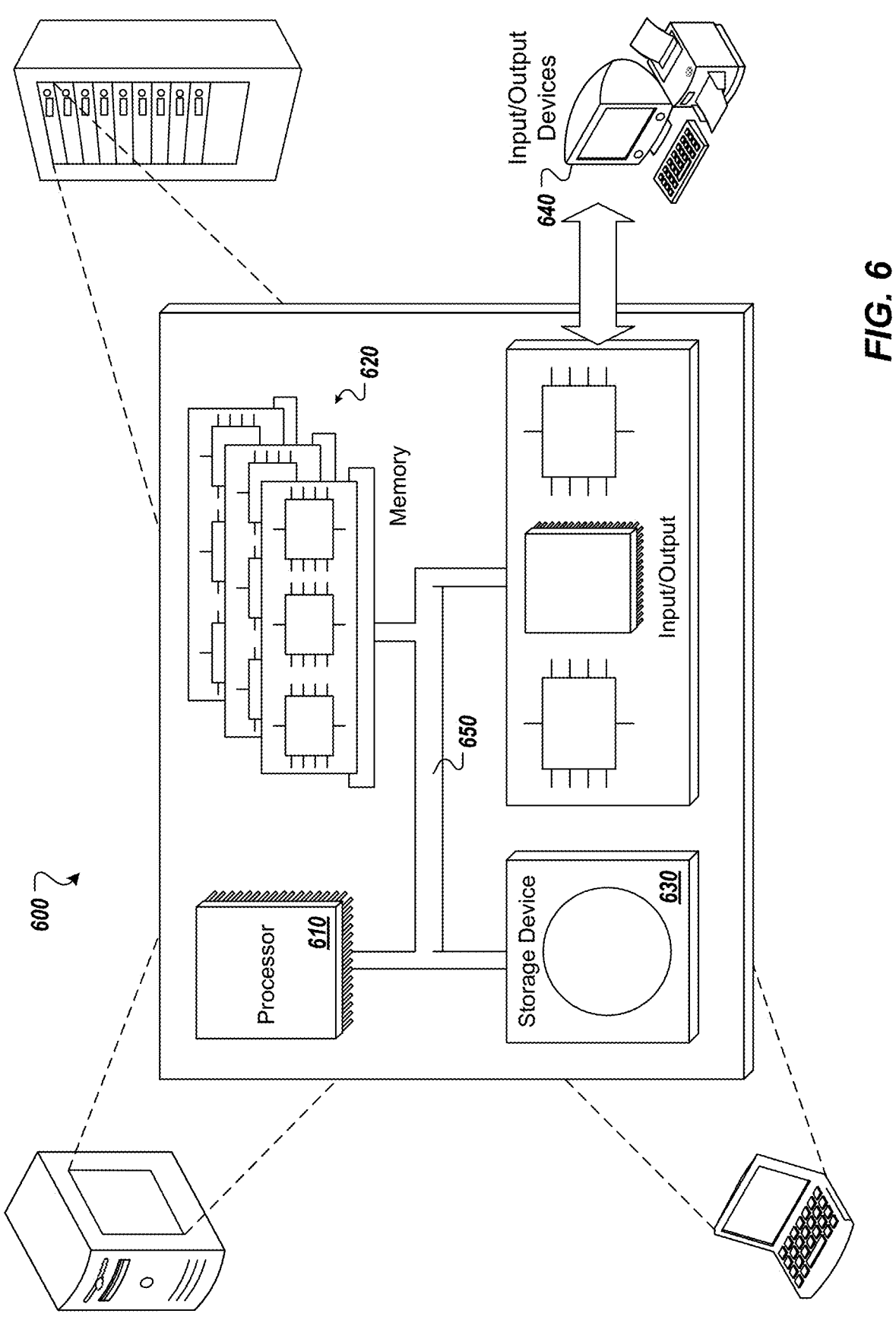
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for matching entities using a machine learning (ML) model, the method being executed by one or more processors and comprising:

during a pre-deployment phase:

determining a set of potential probability thresholds based on a set of inference results provided by processing testing data through the ML model, each inference result being associated with a probability indicating a confidence that the respective inference result is correct, each probability being included in the set of potential probability thresholds;

for each potential probability threshold in the set of potential probability thresholds, determining an accuracy as a number of correct values predicted at or above the respective potential probability threshold among all values predicted at or above the respective potential probability threshold; and selecting a probability threshold from the set of potential probability thresholds;

deploying the ML model for inference in a deployment phase, the ML model being deployed with the probability threshold to reduce a number of entities from inference jobs processed by the ML model; and during the deployment phase:

processing an inference job comprising a first set of entity pairs through the ML model to assign a label to each entity pair in the set entity pairs, each label being associated with a probability and comprising a type of multiple types; and for each entity pair having a label of one or more specified types, selectively removing an entity of the entity pair from further processing of the inference job by the ML model based on whether the probability associated with the label meets or exceeds the probability threshold;

wherein selectively removing an entity of the entity pair from further processing of the inference job by the ML model comprises adding a key of the entity to a set of matched keys in response to determining that the probability associated with the label, wherein the set of matched keys is used to selectively filter entities from being processed in the inference job.

2. The method of claim 1, wherein the probability threshold is selected as a lowest potential probability threshold in the set of potential probability thresholds having an accuracy that meets or exceeds a target accuracy.

3. The method of claim 1, wherein the one or more specified types comprise one or more of a single match and a multi-match.

4. The method of claim 1, wherein the set of potential probability thresholds comprises unique probabilities included in the inference results.

5. The method of claim 1, further comprising:

determining a set of keys for a set of entities, each key in the set of keys uniquely identifying an entity;

comparing keys in the set of keys to matched keys in a set of matched keys; and removing an entity from the set of entities in response to determining that a key identifying the entity is included in the set of matched keys.

6. The method of claim 1, wherein each entity pair comprises a query entity and a target entity, the target entity being selectively removed based on whether the probability associated with the label meets or exceeds the probability threshold.

7. A non-transitory computer-readable storage medium coupled to one or more processors and having instructions stored thereon which, when executed by the one or more processors, cause the one or more processors to perform operations for matching entities using a machine learning (ML) model, the operations comprising:

during a pre-deployment phase:

determining a set of potential probability thresholds based on a set of inference results provided by processing testing data through the ML model, each inference result being associated with a probability indicating a confidence that the respective inference result is correct, each probability being included in the set of potential probability thresholds;

for each potential probability threshold in the set of potential probability thresholds, determining an accuracy as a number of correct values predicted at or above the respective potential probability threshold among all values predicted at or above the respective potential probability threshold; and selecting a probability threshold from the set of potential probability thresholds;

deploying the ML model for inference in a deployment phase, the ML model being deployed with the probability threshold to reduce a number of entities from inference jobs processed by the ML model; and during the deployment phase:

processing an inference job comprising a first set of entity pairs through the ML model to assign a label to each entity pair in the set entity pairs, each label being associated with a probability and comprising a type of multiple types; and for each entity pair having a label of one or more specified types, selectively removing an entity of the entity pair from further processing of the inference job by the ML model based on whether the probability associated with the label meets or exceeds the probability threshold, wherein selectively removing an entity of the entity pair from further processing of the inference job by the ML model comprises adding a key of the entity to a set of matched keys in response to determining that the probability associated with the label, wherein the set of matched keys is used to selectively filter entities from being processed in the inference job.

8. The non-transitory computer-readable storage medium of claim 7, wherein the probability threshold is selected as a lowest potential probability threshold in the set of potential probability thresholds having an accuracy that meets or exceeds a target accuracy.

9. The non-transitory computer-readable storage medium of claim 7, wherein the one or more specified types comprise one or more of a single match and a multi-match.

10. The non-transitory computer-readable storage medium of claim 7, wherein the set of potential probability thresholds comprises unique probabilities included in the inference results.

11. The non-transitory computer-readable storage medium of claim 7, wherein operations further comprise:

determining a set of keys for a set of entities, each key in the set of keys uniquely identifying an entity;

comparing keys in the set of keys to matched keys in a set of matched keys; and removing an entity from the set of entities in response to determining that a key identifying the entity is included in the set of matched keys.

12. The non-transitory computer-readable storage medium of claim 7, wherein each entity pair comprises a query entity and a target entity, the target entity being selectively removed based on whether the probability associated with the label meets or exceeds the probability threshold.

13. A system, comprising:

a computing device; and a computer-readable storage device coupled to the computing device and having instructions stored thereon which, when executed by the computing device, cause the computing device to perform operations for matching entities using a machine learning (ML) model, the operations comprising:

during a pre-deployment phase:

determining a set of potential probability thresholds based on a set of inference results provided by processing testing data through the ML model, each inference result being associated with a probability indicating a confidence that the respective inference result is correct, each probability being included in the set of potential probability thresholds;

for each potential probability threshold in the set of potential probability thresholds, determining an accuracy as a number of correct values predicted at or above the respective potential probability threshold among all values predicted at or above the respective potential probability threshold; and selecting a probability threshold from the set of potential probability thresholds;

deploying the ML model for inference in a deployment phase, the ML model being deployed with the probability threshold to reduce a number of entities from inference jobs processed by the ML model; and during the deployment phase:

processing an inference job comprising a first set of entity pairs through the ML model to assign a label to each entity pair in the set entity pairs, each label being associated with a probability and comprising a type of multiple types; and for each entity pair having a label of one or more specified types, selectively removing an entity of the entity pair from further processing of the inference job by the ML model based on whether the probability associated with the label meets or exceeds the probability threshold:

wherein selectively removing an entity of the entity pair from further processing of the inference job by the ML model comprises adding a key of the entity to a set of matched keys in response to determining that the probability associated with the label, wherein the set of matched keys is used to selectively filter entities from being processed in the inference job.

14. The system of claim 13, wherein the probability threshold is selected as a lowest potential probability threshold in the set of potential probability thresholds having an accuracy that meets or exceeds a target accuracy.

15. The system of claim 13, wherein the one or more specified types comprise one or more of a single match and a multi-match.

16. The system of claim 13, wherein the set of potential probability thresholds comprises unique probabilities included in the inference results.

17. The system of claim 13, wherein operations further comprise:

determining a set of keys for a set of entities, each key in the set of keys uniquely identifying an entity;

comparing keys in the set of keys to matched keys in a set of matched keys; and removing an entity from the set of entities in response to determining that a key identifying the entity is included in the set of matched keys.

\* \* \* \* \*